(12) United States Patent
Clifford et al.

(10) Patent No.: US 7,510,468 B2
(45) Date of Patent: Mar. 31, 2009

(54) GUIDE FOR CARCASS BACKSAW AND METHOD OF USE

(75) Inventors: James Clifford, Amarillo, TX (US); Mark Heidlage, Dumas, TX (US)

(73) Assignee: JBS Swift & Company, Greeley, CO (US)

( * ) Notice: Subject to any disclaimer, the term of this patent is extended or adjusted under 35 U.S.C. 154(b) by 0 days.

(21) Appl. No.: 11/613,077

(22) Filed: Dec. 19, 2006

(65) Prior Publication Data

US 2007/0232213 A1    Oct. 4, 2007

Related U.S. Application Data

(60) Provisional application No. 60/753,282, filed on Dec. 19, 2005.

(51) Int. Cl.
*A22B 3/10* (2006.01)
*A22C 17/00* (2006.01)

(52) U.S. Cl. .................................. 452/160; 452/152

(58) Field of Classification Search ................ 452/152, 452/153, 160, 163, 164
See application file for complete search history.

(56) References Cited

U.S. PATENT DOCUMENTS

| | | | | |
|---|---|---|---|---|
| 3,402,425 | A | * | 9/1968 | Wexel ........................ 452/149 |
| 3,402,426 | A | * | 9/1968 | Wexel ........................ 452/160 |
| 3,533,131 | A | | 10/1970 | Ivarsson |
| 4,507,822 | A | * | 4/1985 | Herubel ..................... 452/160 |
| 4,653,150 | A | * | 3/1987 | Leining ...................... 452/160 |
| 4,667,368 | A | | 5/1987 | Menqi |
| 4,970,756 | A | | 11/1990 | Durand |
| 5,139,457 | A | | 8/1992 | Rankin et al. |
| 5,147,240 | A | | 9/1992 | Hazenbroek et al. |
| 5,160,295 | A | * | 11/1992 | Bekkers ..................... 452/160 |
| 5,312,292 | A | | 5/1994 | Rankin et al. |
| 5,613,905 | A | | 3/1997 | Van Ochten et al. |
| 6,027,405 | A | | 2/2000 | Leining et al. |
| 6,050,889 | A | | 4/2000 | Jacobs et al. |
| 6,126,536 | A | | 10/2000 | Kielwasser |
| 6,468,146 | B1 | | 10/2002 | Loseke |
| 6,607,431 | B2 | | 8/2003 | Torrelli |

OTHER PUBLICATIONS

"Carcass Splitting Bandsaw Model Buster IV", Jarvis Products Corporation, date unknown, 2 pages.
International Search Report for International (PCT) Patent Application No. PCT/US06/48687, mailed Apr. 14, 2008.
Written Opinion for International (PCT) Patent Application No. PCT/US06/48687, mailed Apr. 14, 2008.
International Preliminary Report on Patentability for International (PCT) Patent Application No. PCT/US2006/048687, mailed Jul. 3, 2008.

* cited by examiner

*Primary Examiner*—David J Parsley
(74) *Attorney, Agent, or Firm*—Sheridan Ross P.C.

(57) ABSTRACT

A guide for providing a controlled cut down a longitudinal length of a spine of a carcass using a backsaw includes first and second guide members, wherein the guide members are preferably interconnected by a lateral bracing member. The guide members are fixedly secured to a blade guide of the backsaw. The guide members include a front surface sloped relative to the front of the blade guide. In use, the guide members contact the carcass on either side of the spine and maintain a blade alignment down the spinal column of the carcass.

17 Claims, 12 Drawing Sheets

GUIDE FOR CARCASS BACKSAW AND METHOD OF USE

CROSS-REFERENCE TO RELATED APPLICATIONS

The present invention claims priority to U.S. Provisional Patent Application Ser. No. 60/753,282 filed on Dec. 19, 2005, and entitled "GUIDE FOR CARCASS BACKSAW," the content of which is incorporated herein by reference in its entirety.

FIELD

The present invention relates to meat processing equipment, and more particularly, to a guide for a backsaw that is used to split a carcass longitudinally down the spine.

BACKGROUND

When a carcass is split longitudinally down the spine, care must be taken to ensure that the saw does not move laterally. If the saw drifts laterally away from the spine and into the meat of the carcass, the quality of meat may be severally impacted. The carcass may even become unusable for meat. Accordingly, the carcass must be held in a centered alignment when it is split.

A number of different prior art devices exist for stabilizing and/or aligning a carcass. For instance, U.S. Pat. No. 6,050,889 to Jacobs et al. discloses an apparatus for dividing a carcass along the spinal column. The carcass is held and aligned by means of guiding rollers that engage the back inside of the carcass, and support means that engage the back of the carcass. The support means comprise two plate shaped members that engage the carcass on either side of the spine. When the carcass is divided, the saw blade, guided by rollers, passes through the spine and between the two plate-shaped support members.

U.S. Pat. No. 4,667,368 to Menqi discloses a guiding device that cooperates with the inner face of the backbone of an animal carcass. The device is used in conjunction with a roller that cooperates with the outer face of the backbone of the carcass. The device is characterized by two guiding surfaces and connected to a rocking lever. The rocking lever is pivoted on a support member. The two guiding surfaces and are recessed in the shape of a V. The two guiding surfaces have curved ends designed to engage portions of the backbone.

U.S. Pat. No. 3,533,131 to Ivarsson discloses a machine for splitting animal carcasses along the backbone. The splitting saw is mounted on a guiding mechanism that alternates between a working and a resting position. The carcass is guided by a fixed U-shaped guide member comprising two bars situated on opposite sides of the backbone of the carcass.

The devices described above that are used to stabilize a carcass do not have a desirable shape and are not useable as an attachment to a bandsaw-type backsaw. In particular, the plate shaped support members of Jacobs are too large to be mounted on a bandsaw. The guide surfaces of Menqi are shaped to directly engage the spine. In order for a support device to be usable with a bandsaw, the device needs to engage portions of the carcass lateral to the spine in order to allow the bandsaw to pass through the spine. The bars disclosed Ivarsson are not easily mounted on a bandsaw and do not provide a reliable engagement surface for the carcass.

Figure 1A:
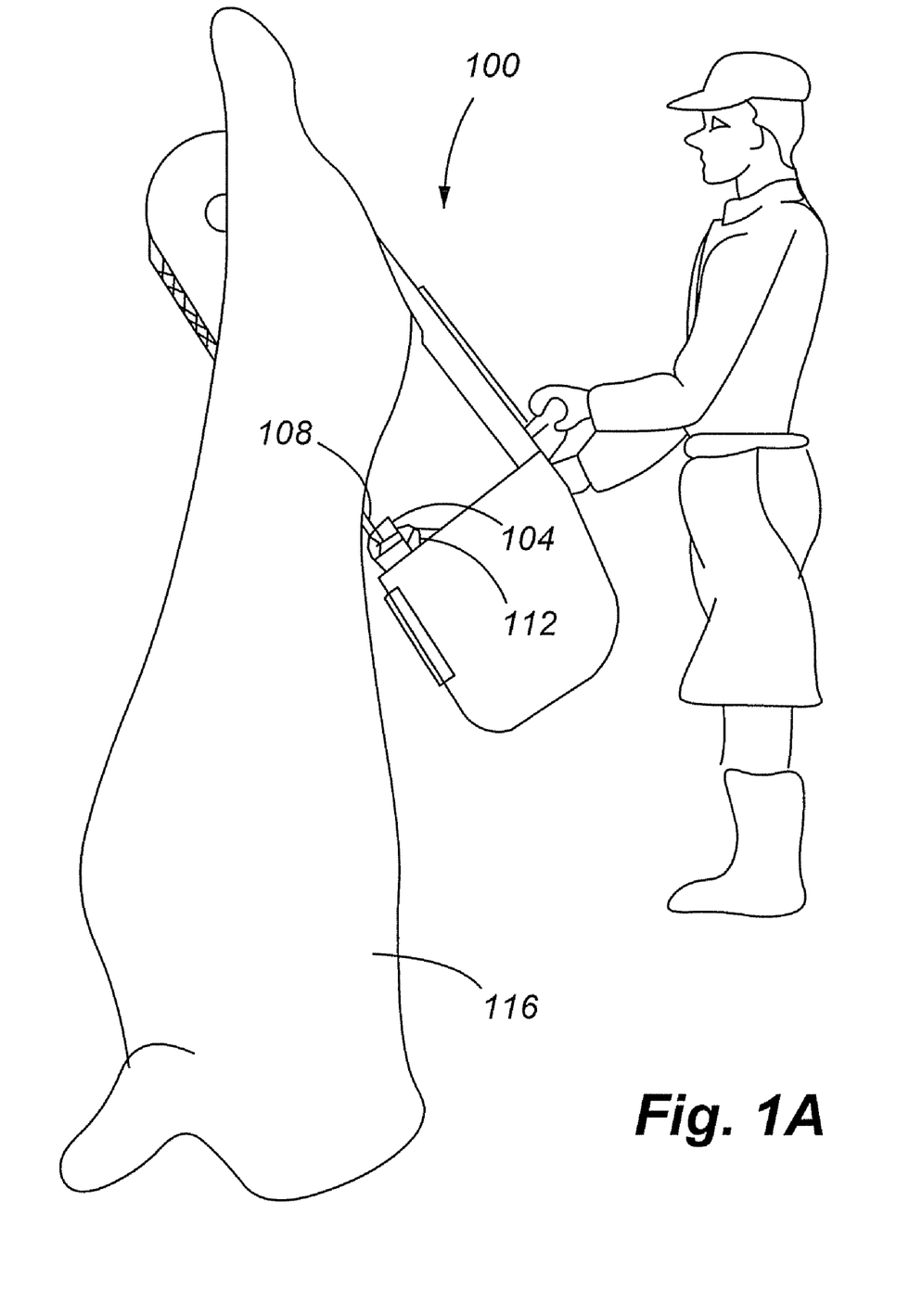
FIG. 1a. is a side view of a backsaw shown in operation.
Figure 1B:
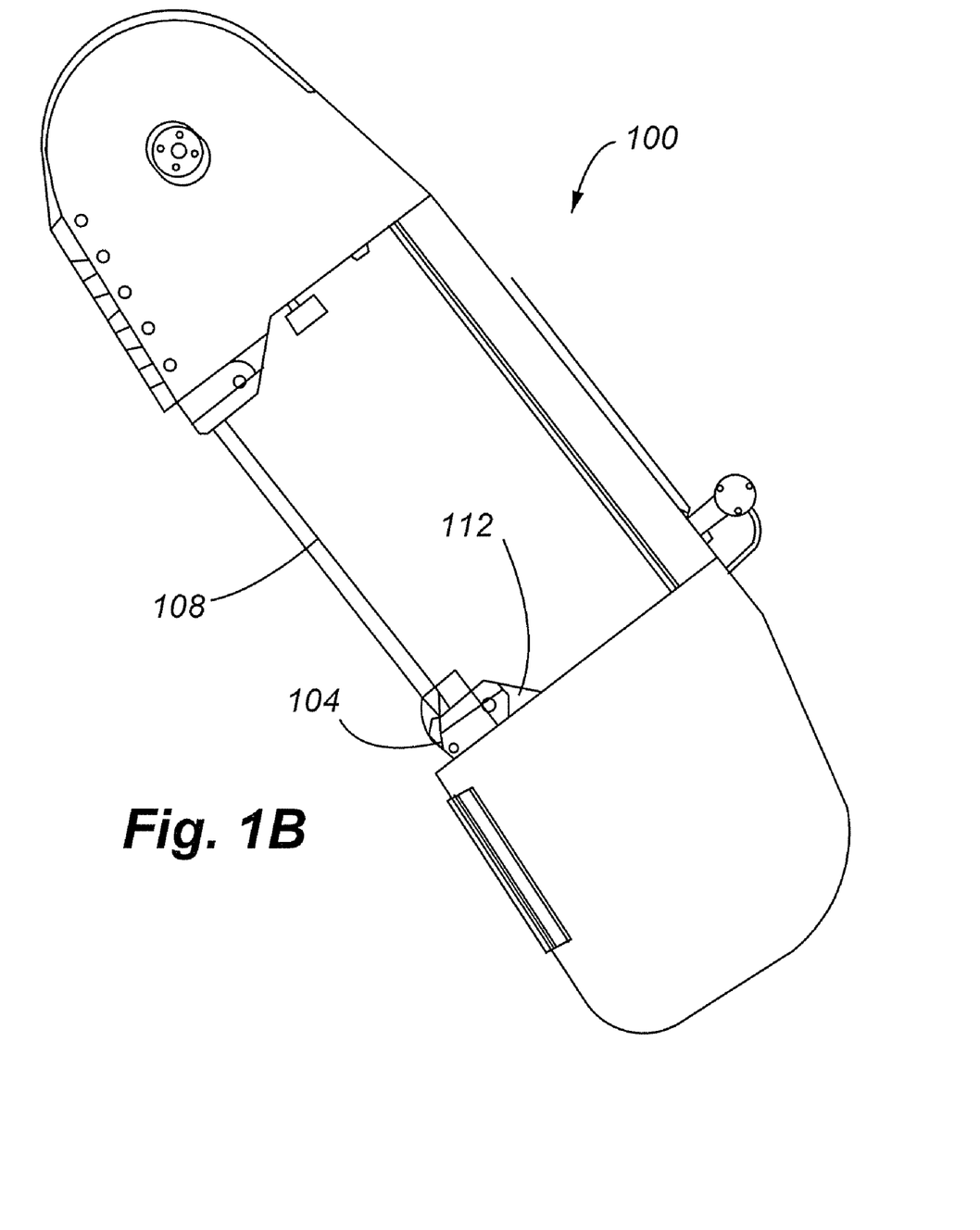
FIG. 1b. is a side view of a backsaw.

Backsaw attachments exist that engage the carcass, however, they do not serve to stabilize the carcass. One such attachment will be discussed in connection with the operation of a bandsaw-type carcass backsaw. With reference to FIG. 1a, a backsaw 100 including a blade guide guard 104 is shown in use. The backsaw 100 includes a bandsaw blade 108 and a removable blade guide 112. An enlarged view of the backsaw 100 along with the blade guide guard 104 is shown in FIG. 1b. Backsaws of this type are available from a variety of manufactures including Jarvis, Inc. Saws of the this type are sold by Jarvis under the name Buster Saw.

Figure 2A:
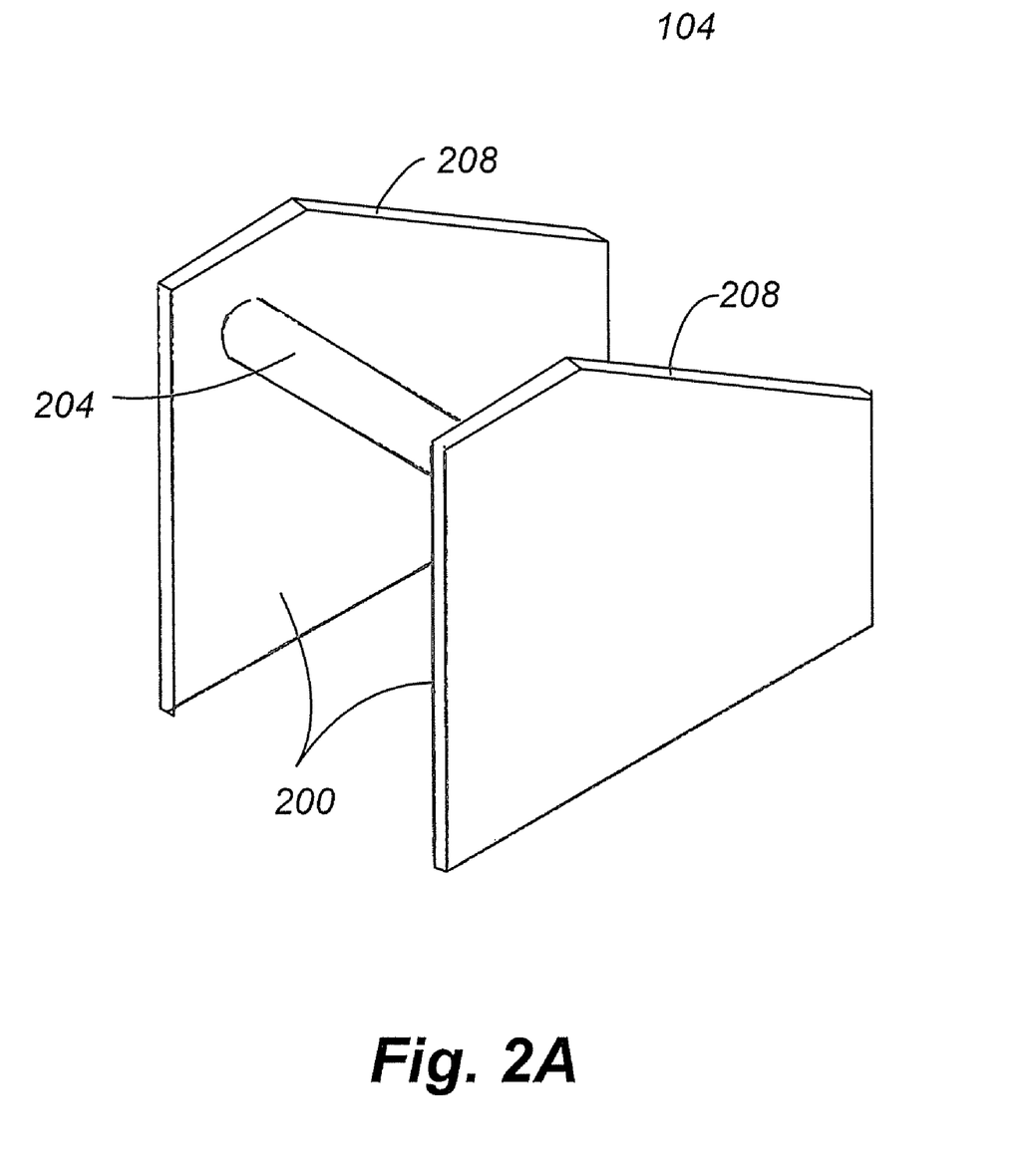
FIG. 2a is a perspective view of a prior art blade guide guard.
Figure 2B:
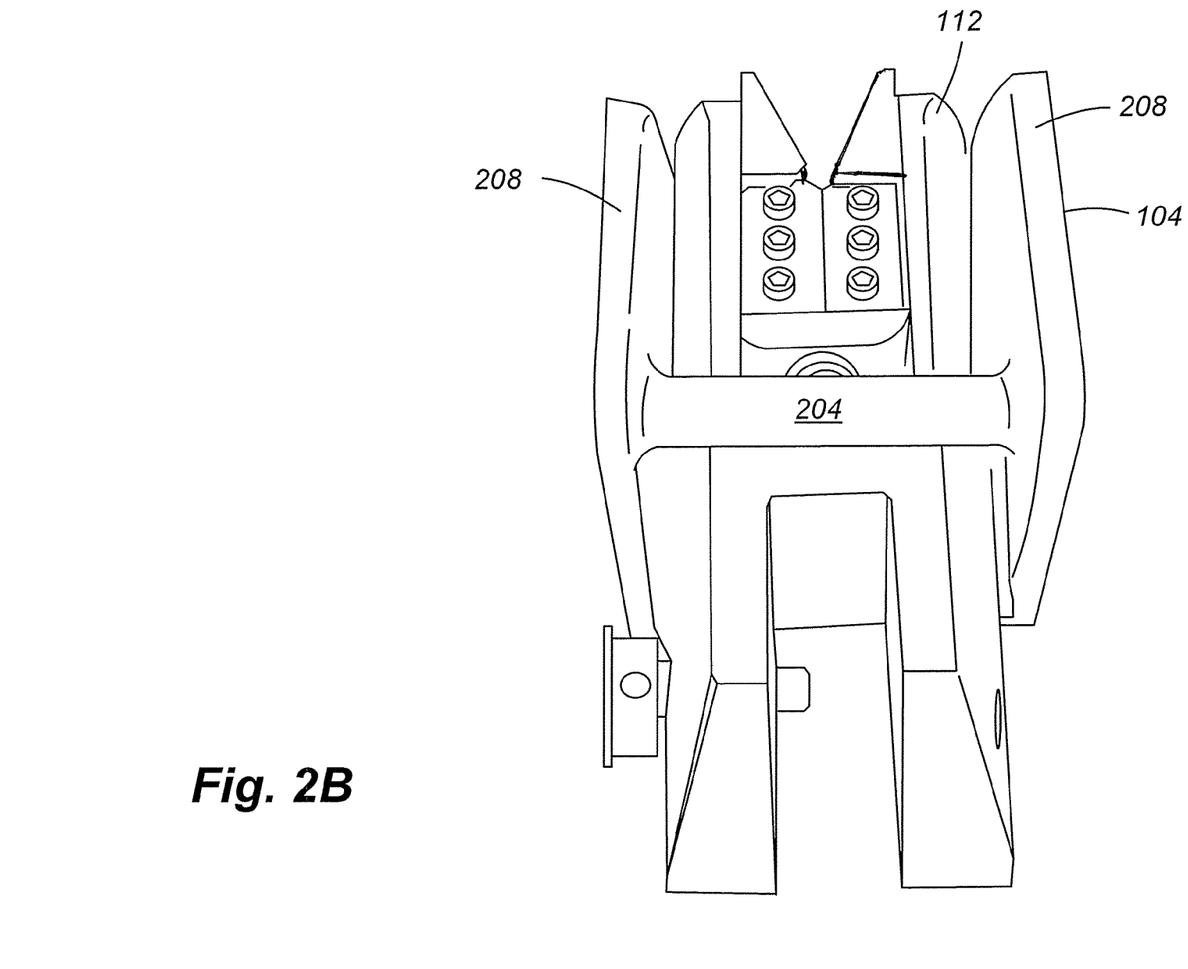
FIG. 2b is a rear view of the device shown in FIG. 2a, wherein the device is shown attached to a blade guide.

An enlarged perspective view of the blade guide guard 104 is shown in FIG. 2a. A blade guide guard with a similar construction is available from Jarvis under the part number #1024063. The blade guide guard 104 includes sides walls 200 that are interconnected by means of a lateral rod 204. As shown in FIG. 2b, the blade guide guard 104 fits over the blade guide 112 (shown removed from the backsaw 100). In this position the two parts are welded or bolted together. In use, the sloped edge 208 of the blade guide may press against the carcass 116. This protects the blade 108 by preventing it from being driven into the blade guide 112.

The prior art blade guide guard 104 serves only to protect the blade 108 and does not function to guide the backsaw 100. In particular, when the backsaw 100 including the guide 104 is used to split a carcass 116, the backsaw is unguided and tends to drift laterally leading to an uneven cut. More particularly, the sloped edge 208 is not designed to keep the carcass 116 in position. For this reason, the carcass 116 may drift off center and out of alignment with the blade 108 when the backsaw 100 is in operation. Accordingly, it would be desirable to have a backsaw attachment that, when pressed against a carcass, holds the carcass in position and thus guides the backsaw 100.

SUMMARY

It is to be understood that the present invention includes a variety of different versions or embodiments, and this Summary is not meant to be limiting or all inclusive. This Summary provides some general descriptions of some of the embodiments, but may also include some more specific descriptions of certain embodiments.

The present invention is a guide for a backsaw for splitting a carcass. In accordance with embodiments of the present invention, the guide comprises a device that is interconnected to an existing backsaw. Alternatively, the guide may be integrally made with the body of the backsaw, or alternatively yet, otherwise interconnected to the backsaw. The device includes first and second guide members that traverse down first and second sides of the spine, respectively, as the backsaw is used to split the carcass. In operation, the operator of the backsaw orients the backsaw for essentially bisecting the spine in a longitudinal direction.

The guide is interconnected to the backsaw and pressed against the carcass, such that a first guide member is on one side of the spine and the second guide member is on the other side of the spine. The backsaw is then traversed along the length of the spine, and the blade of the backsaw longitudinally cuts the spine in two. During the process of cutting the spine, the guide members substantially maintain the blade in alignment with or sufficiently proximate the center of the spine, such that the spine is cut without meandering outside of the boundary of the spinal column.

In one embodiment of the invention, each guide member includes a wall and wing that extends laterally form the wall. Alternatively, the wings may be interconnected or otherwise attached to the backsaw directly without an associated wall.

In use, the front or top surface of the wing engages the carcass. The operator presses the guide against the back of the carcass as the saw cuts the spine in a longitudinal direction.

The wings of the guide maintain the blade within the boundary of the spine as the spine is cut, thereby splitting the carcass.

The wings of the guide can have various shapes and curvatures designed to provide an optimal engagement with the carcass. In one embodiment, the guide members are interconnected by means of a lateral rod, and in such embodiments, the guide may be bolted, welded or otherwise attached to a blade guard portion of the backsaw.

Thus, in accordance with at least one embodiment of the present invention, a guide device for a backsaw having a bandsaw blade is provided, the backsaw used to cut a carcass longitudinally down a spine of the carcass, the device comprising: first and second curved members interconnected to the bandsaw, the first curved member located on a first lateral side of the bandsaw blade and the second curved member located on a second lateral side of the bandsaw blade; whereby the curved members are adapted to permit the backsaw to come into contact with the carcass so that the bandsaw blade is maintained substantially along the spine of the carcass when the carcass is split longitudinally. The guide device may further comprise walls attached to the curved members at an angle of at least 90 degrees. In addition, at least one lateral member may be provided to interconnect the walls.

A method of splitting a carcass is also provided as a separate aspect of the present invention. Thus, a method of splitting a carcass using a bandsaw is provided, the method comprising: aligning the bandsaw with a spine of the carcass; applying the bandsaw to cut the spine in a longitudinal direction; maintaining the bandsaw within the spine of the carcass by contacting a guide attached to the bandsaw to the carcass, the contacting comprising engaging portions of the carcass lateral to the spine with first and second carcass engaging surfaces of the guide, wherein the spine is received between the first and second carcass engaging surfaces, the carcass engaging surfaces being disposed at an angle from a reference plane, the reference plane being perpendicular to a plane of the saw; and extending cutting the spine until the carcass is split longitudinally. In accordance with embodiments of the present invention, the contacting comprises maintaining contact between said first and second carcass engaging surfaces and the carcass during at least 50% of the cutting operation. The method may include other steps.

Various embodiments of the present invention are set forth in the attached figures and in the detailed description of the invention as provided herein and as embodied by the claims. It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

Additional advantages of the present invention will become readily apparent from the following discussion, particularly when taken together with the accompanying drawings.

DETAILED DESCRIPTION

Figure 3A:
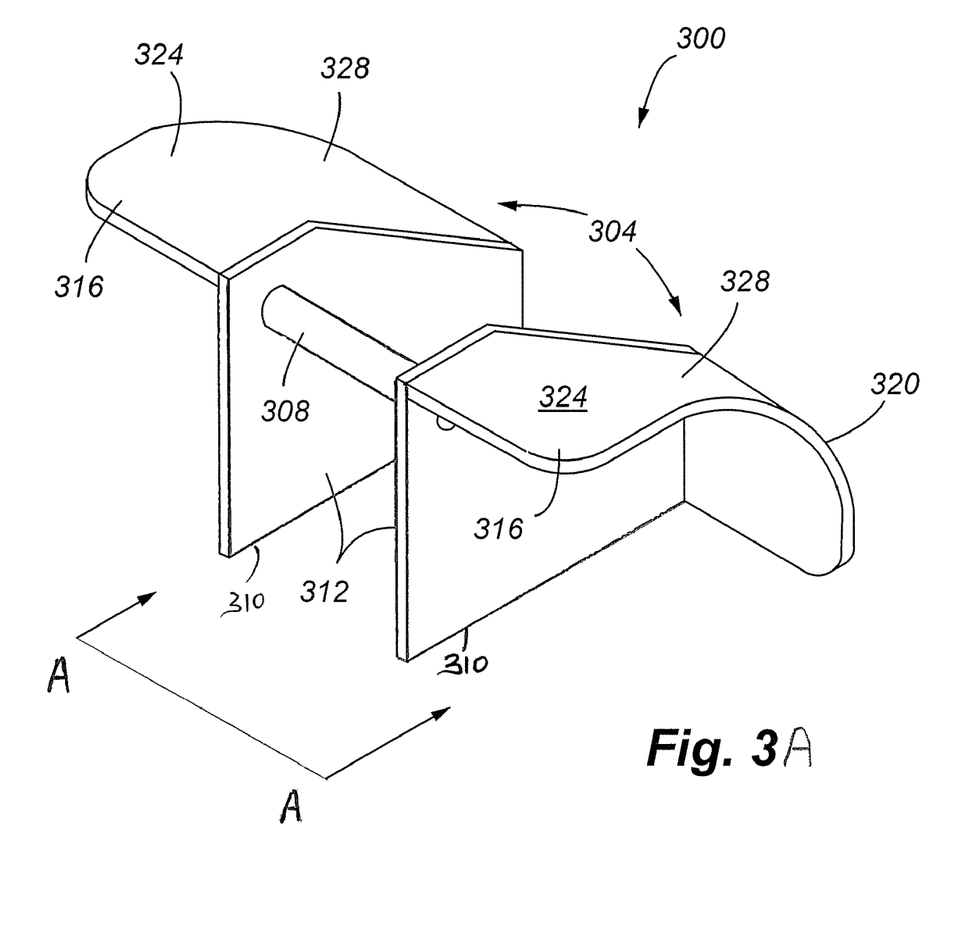
FIG. 3A is a reverse angle perspective view of an embodiment of the present invention.
Figure 3B:
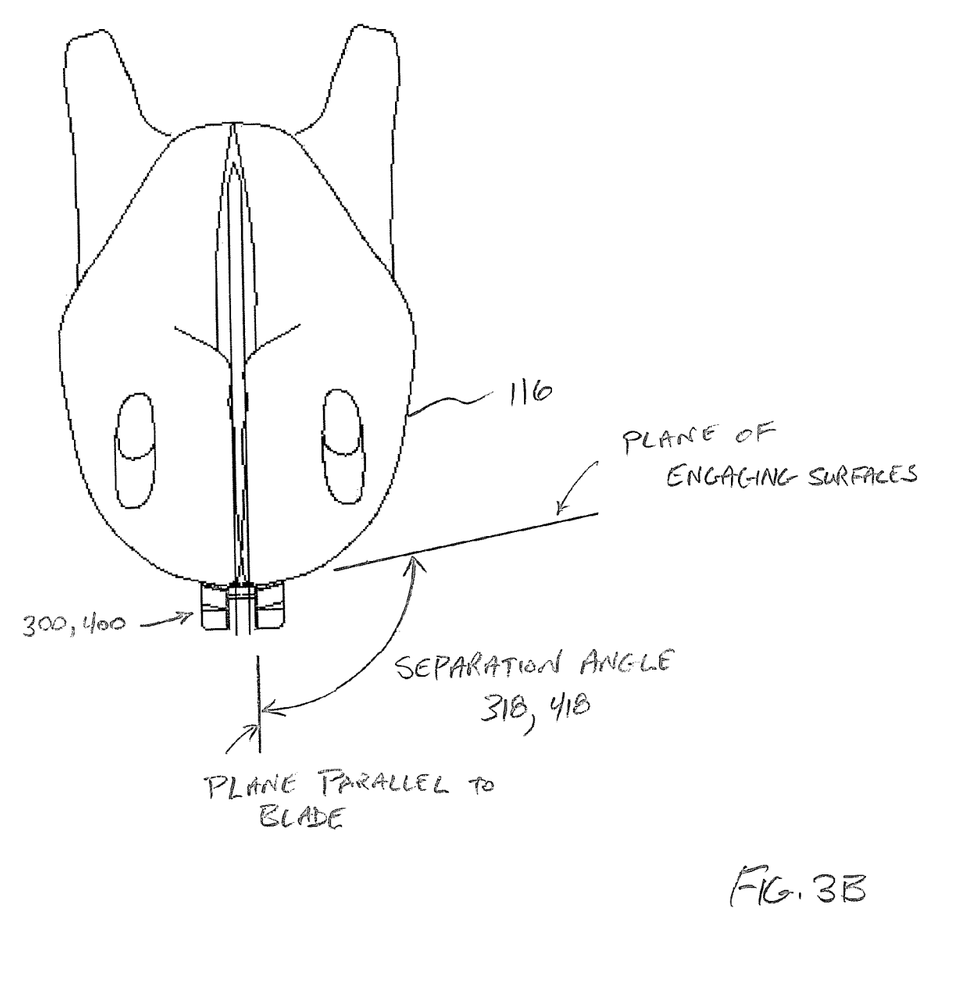
FIG. 3B is a top elevation view of the device of FIG. 3A, wherein the device is positioned against a carcass.

The present invention is a device for guiding a backsaw longitudinally down the spine of a carcass, such as a beef carcass. With reference to FIG. 3A, a backsaw guide is generally identified by reference numeral 300 and is shown unattached to a blade guide 112. The guide 300 includes first and second guide members 304 that are interconnected by means of a lateral rod 308. The guide members 304 include substantially parallel side walls 312 that define a reference plane A-A that is perpendicular to the sides walls 312, where plane A-A is defined by the underside or rear surfaces 310 of parallel side walls 312. The guide members 304 also include wings or wing-like carcass engaging surfaces 316 that extend laterally from the parallel side walls 312. Preferably, the surfaces 316 extend laterally for a distance of between about one and three inches. The carcass engaging surfaces 316 include first portions 320 that are substantially perpendicular to the reference plane A-A, and second portions 324 that are substantially parallel to the reference plane A-A. The carcass engaging surfaces 316 also include sloping portions 328 that provide a transition between the first portions 320 and the second portions 324. The carcass engaging surfaces 316 are angled away from the side walls 312 at a separation angle 318, where the separation angle 318 is greater than ninety degrees. FIG. 3B illustrates the guide 300 engaging a carcass 116, and further shows the separation angle 318.

Like the prior art blade guide guard 104, the backsaw guide 300 can be mounted to the removable blade guide 112 of the backsaw 100, such that the blade guide 112 is disposed between the two side walls 312 of the guide members 304. The backsaw guide 300 is mounted to the blade guide 112 in an orientation such that the first portion 320 of the carcass engaging surface 316 is forward or towards the carcass. As used herein, the forward direction is defined as towards the carcass 116 and the rearward direction is defined as away from the carcass 116.

The backsaw guide 300 serves to guide the backsaw 100 along the spine of the carcass 116 to provide a controlled split of the carcass 116. In particular, the carcass engaging surfaces 316 of the guide member 304 engage the carcass 116 on either side of the spine, and the blade 108, which is disposed between the guide members 304, directly engages the spine. As the carcass engaging surfaces 316 are angled away from the side walls 312 of the guide members 304 at separation angle 318, they operate to cradle the carcass 116 such that it is supported in a centered alignment with the blade 108. During the split of the carcass 116, the entirety of the carcass engaging surfaces 316 may engage the carcass 116. However, at various times, the carcass may be in contact with only a portion of the carcass engaging surfaces 316. For example, if the backsaw 100 is used to split the carcass 116 from top to bottom, as shown in FIG. 1, the first portions 320 may initially engage the carcass 116. Thereafter, the entirety of the carcass engaging surfaces 316 may come in contact with the carcass 116. In accordance with embodiments of the present invention, the carcass engaging surfaces contact the carcass during at least about 20 to 100% of the cutting operation, and more preferably between about 35 to 100% of the cutting operation, and more preferably yet, during at least 50% of the cutting operation.

Figure 4:
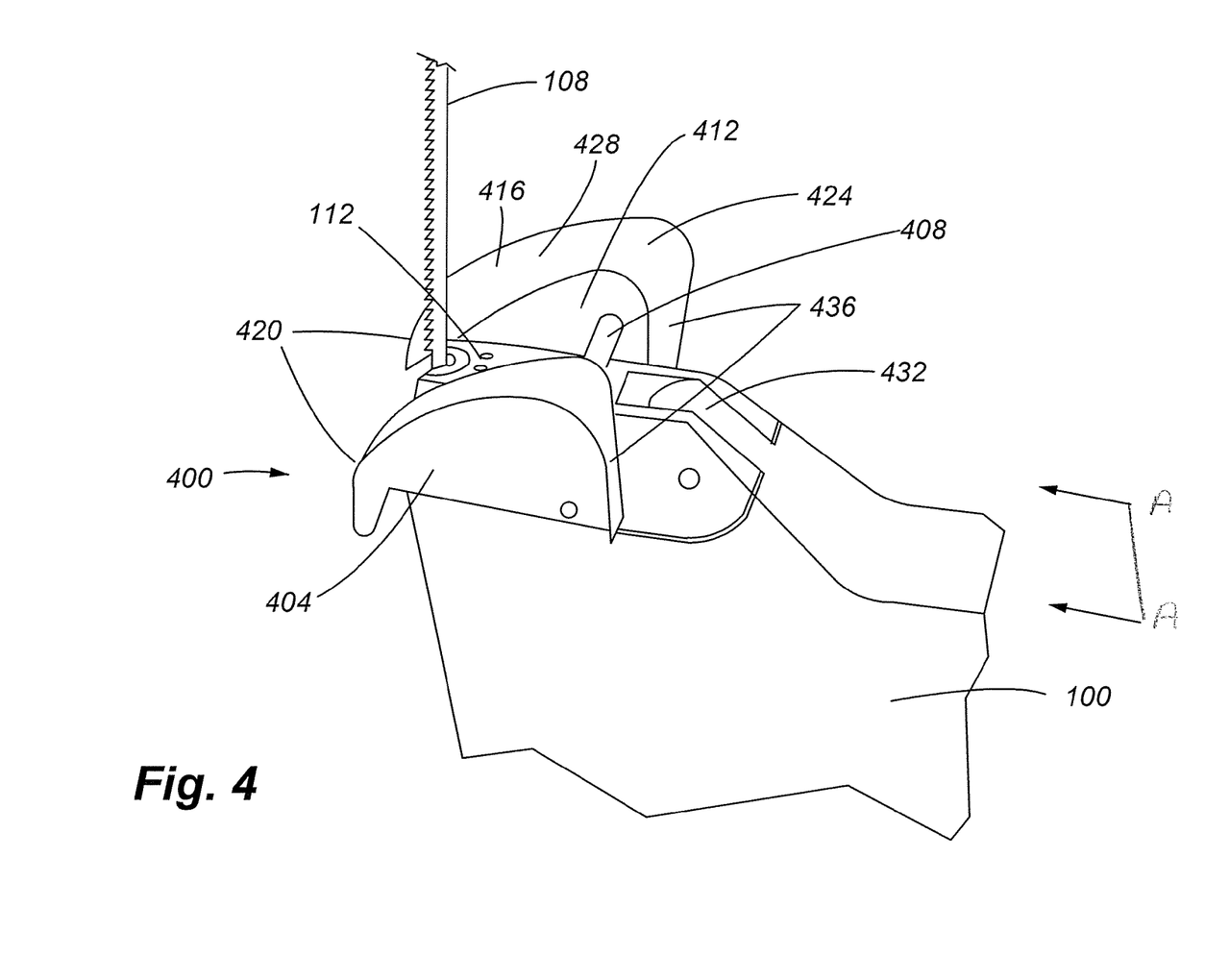
FIG. 4 is a perspective view of an alternative embodiment of the present invention shown attached to a backsaw.
Figure 5:
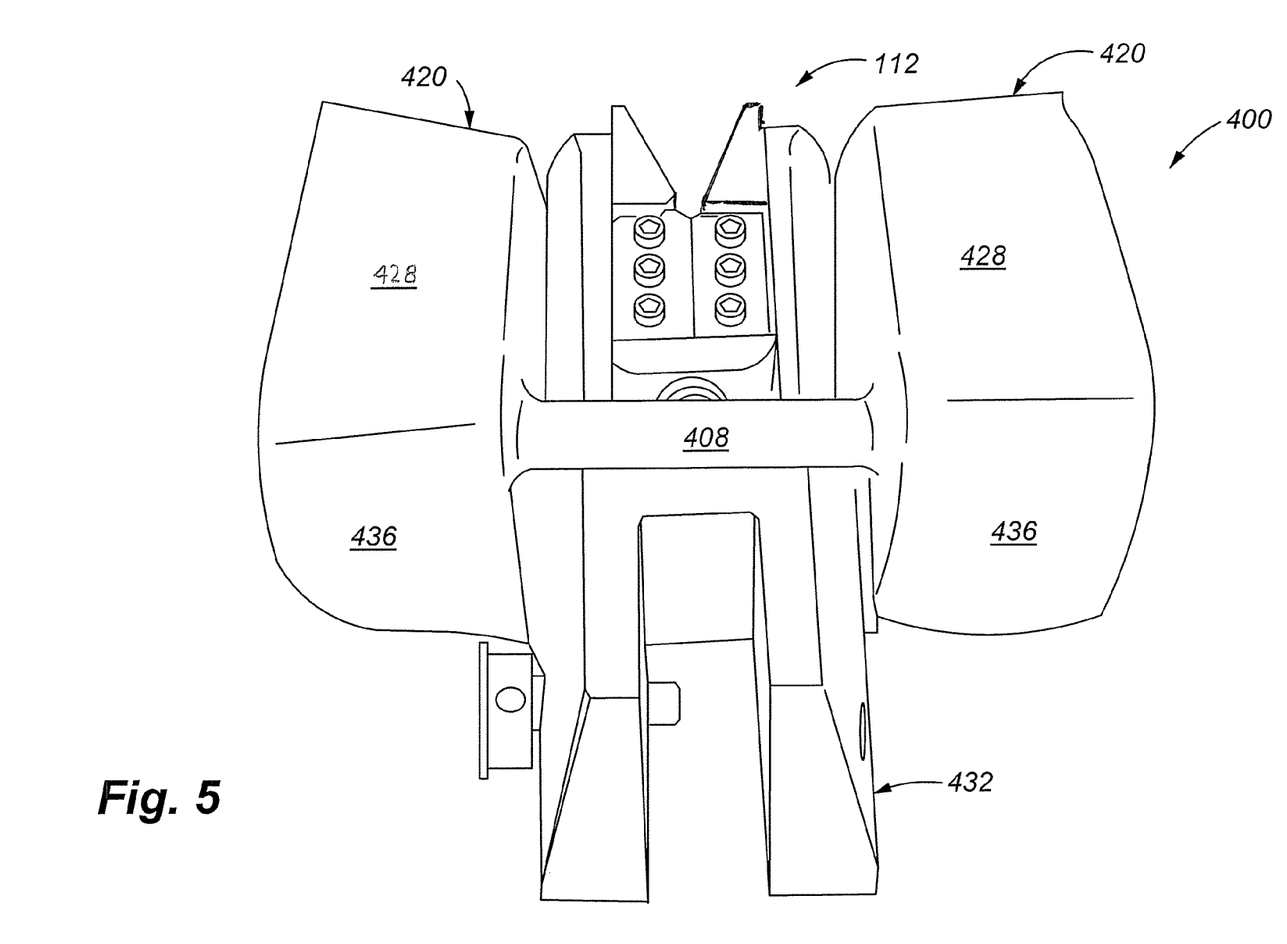
FIG. 5 is a rear view of the device shown in FIG. 4.

Referring now to FIGS. 4 and 5, an alternative embodiment of the present invention is shown that is generally identified by reference numeral 400. The present embodiment includes a rearward extension of the carcass engaging surfaces, as described in greater detail below. FIG. 4 shows the backsaw guide 400 mounted to a blade guide 112 that is attached to a backsaw 100. Only a portion of the backsaw 100 is illustrated in FIG. 4. FIG. 5 shows a perspective view of the backsaw guide 400 mounted to a blade guide 112 that is not attached to a backsaw 100. In accordance with at least one embodiment of the present invention, guide 400 includes first and second guide members 404, and also preferably includes a means for interconnecting the members 404, such as a lateral rod 408.

Referring still to FIGS. 4 and 5, the guide members 404 are positioned on either side of a blade guide 112. The blade guide 112 serves to guide the saw blade 108 within the backsaw 100, while the guide 400 of the present invention serves to guide the backsaw 100 along the spine of the carcass 116 to provide a controlled split of the carcass down the longitudinal length of the carcass 116. The guide members 404 are preferably fixedly secured to the blade guide 112, such as by bolts. The blade guide 112 and the attached guide 400 are interconnected to the backsaw 100, such as by using a tongue and groove connector 432. While FIGS. 4 and 5 illustrate the attachment of the guide 400, it should be understood that a similar attachment is used in connection with guide 300.

The guide members 404 include substantially parallel side walls 412 that define a reference plane A-A that is perpendicular to the sides walls 412. The guide members 404 also include wing-like carcass engaging surfaces 416 that extend laterally from the substantially parallel side walls 412. The carcass engaging surfaces 416 are angled away from the side walls 412. Like the guide 300 shown in FIG. 3A, the carcass engaging surfaces 416 extend laterally from the side walls 412 for a distance of approximately one to three inches. Preferably, the carcass engaging surfaces 416 are positioned at a separation angle 418 of greater than 90 degrees, such as between 90 and 135 degrees away from the lateral side walls 412. More preferably, the carcass engaging surfaces 416 are positioned at a separation angle 418 of between 95 and 115 degrees away from the lateral side walls 412. More preferably still, the carcass engaging surfaces 416 are positioned at a separation angle 418 of between 97 and 112 degrees away from the lateral side walls 412. Alternatively, the angle of the carcass engaging surfaces 416 may be defined with reference to a reference plane defined as being perpendicular to the plane of the backsaw blade 108. Accordingly, the above ranges would be defined as between 0 and 45 degrees, 5 and 25 degrees, and 7 and 12 degrees, respectively, relative to the reference plane. While the above dimensions are described in connection with backsaw guide 400, it should be understood that similar dimensions apply to backsaw guide 300.

The present embodiment includes a rearward extension of the carcass engaging surfaces. Like the backsaw guide shown 300 shown in FIG. 3A, the carcass engaging surfaces 416 include a first portion 420 that is substantially perpendicular to the reference plane A-A, a second portion 424 that is substantially parallel to the reference place A-A, and sloping portions 428 that provide a transition between the first portion 420 and the second portion 424. Additionally, the backsaw guide 400 includes rearward portions 436 of the carcass engaging surfaces 416 that are oriented substantially perpendicular to the reference plane A-A. The rearward or third portions 436 of the carcass engaging surfaces 416 provide a robust support for the carcass, particularly when steeper and wider carcass engaging surfaces 416 are employed.

Figure 6:
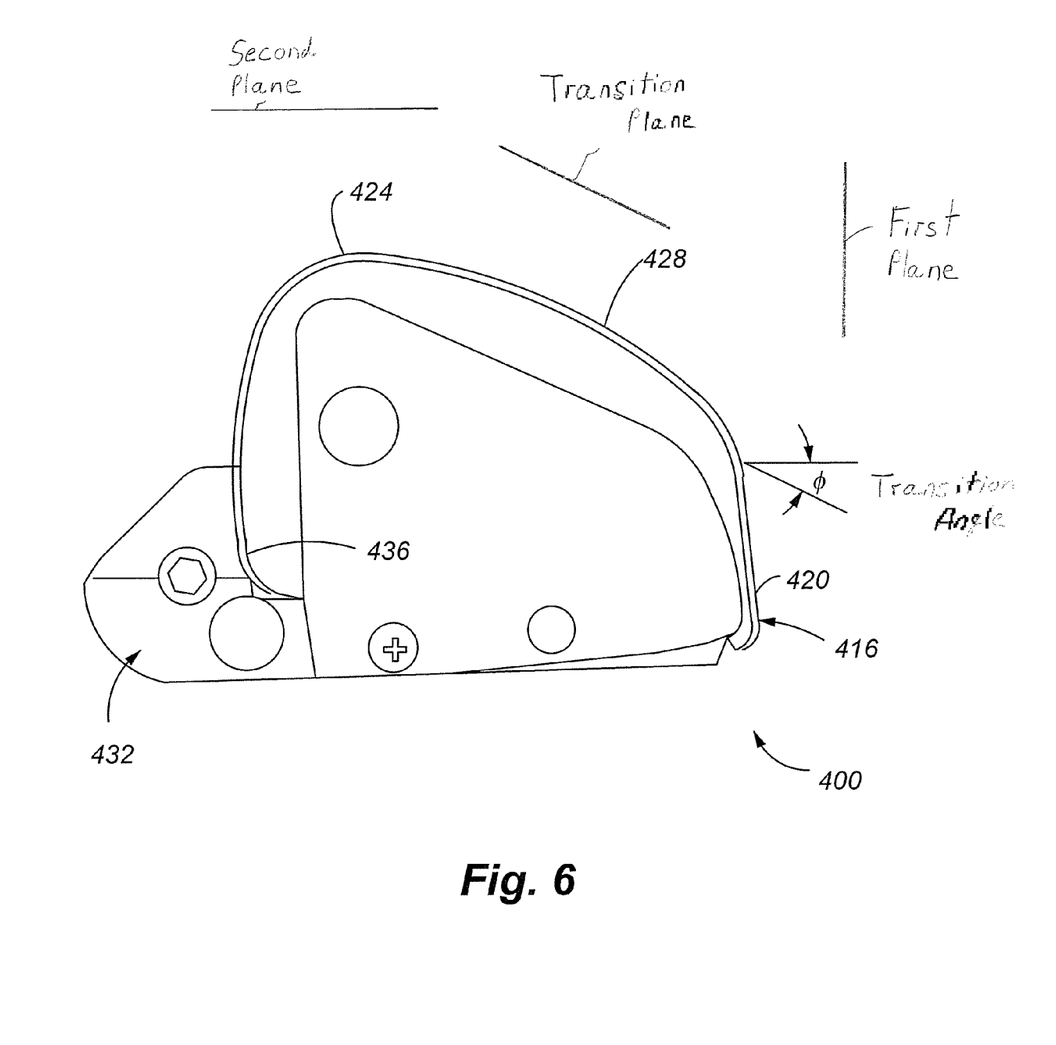
FIG. 6 is a side view of the device shown in FIG. 4.

Referring now to FIG. 6, a side elevation view of a guide member 400 is illustrated showing the various portions of one carcass engaging member 404. The sloping portion 428 preferably slopes at a transition angle φ of about 10 to 40 degrees downward from the second portion 424 of the guide member 404 to a first portion 420 of the guide member 404, and more preferably, the sloping portion 428 slopes at an angle φ of about 15 to 35 degrees downward from the second portion 424 of the guide member 404 to the first portion 420 of the guide member 404, and more preferably yet, the sloping portion 428 slopes at an angle φ of about 20 to 30 degrees downward from second portion 424 of the guide member 404 to first portion 420 of the guide member 404. While the above dimensions are described in connection with backsaw guide 400, it should be understood that similar dimensions apply to backsaw guide 300.

Figure 7:
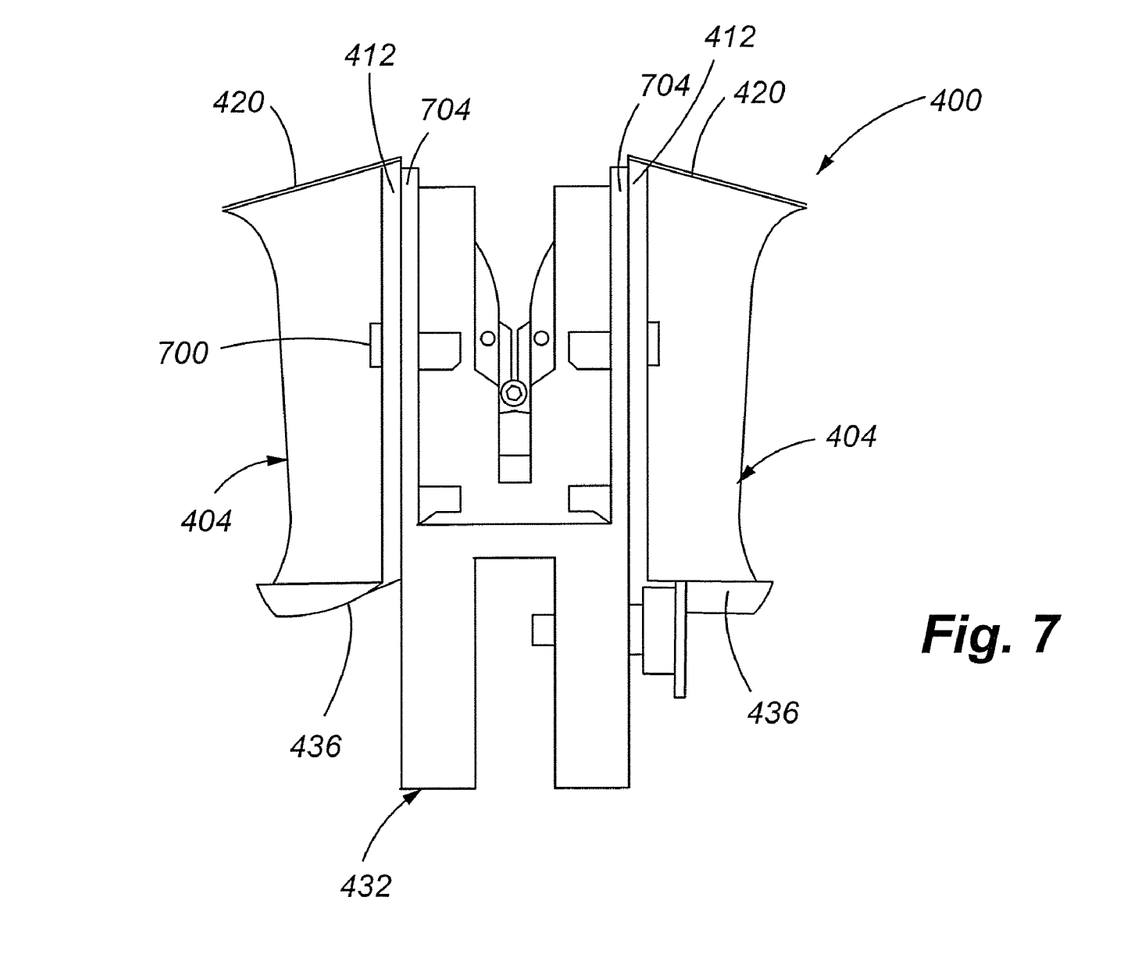
FIG. 7 is a bottom view of the device shown in FIG. 4.

Referring now to FIG. 7, a bottom view of the guide 400 is shown. The side walls 412 of the guide members 404 can be seen bolted to the blade guide 112 using bolts 700. A rear or back surface 704 of the blade guide 116 is substantially parallel to a front surface (both of which are substantially parallel to reference plane A-A), of the blade guide 112 and the sloping portions 428 of each guide member 404 is offset from the back surface 704 at an angle φ as described above.

Figure 8:
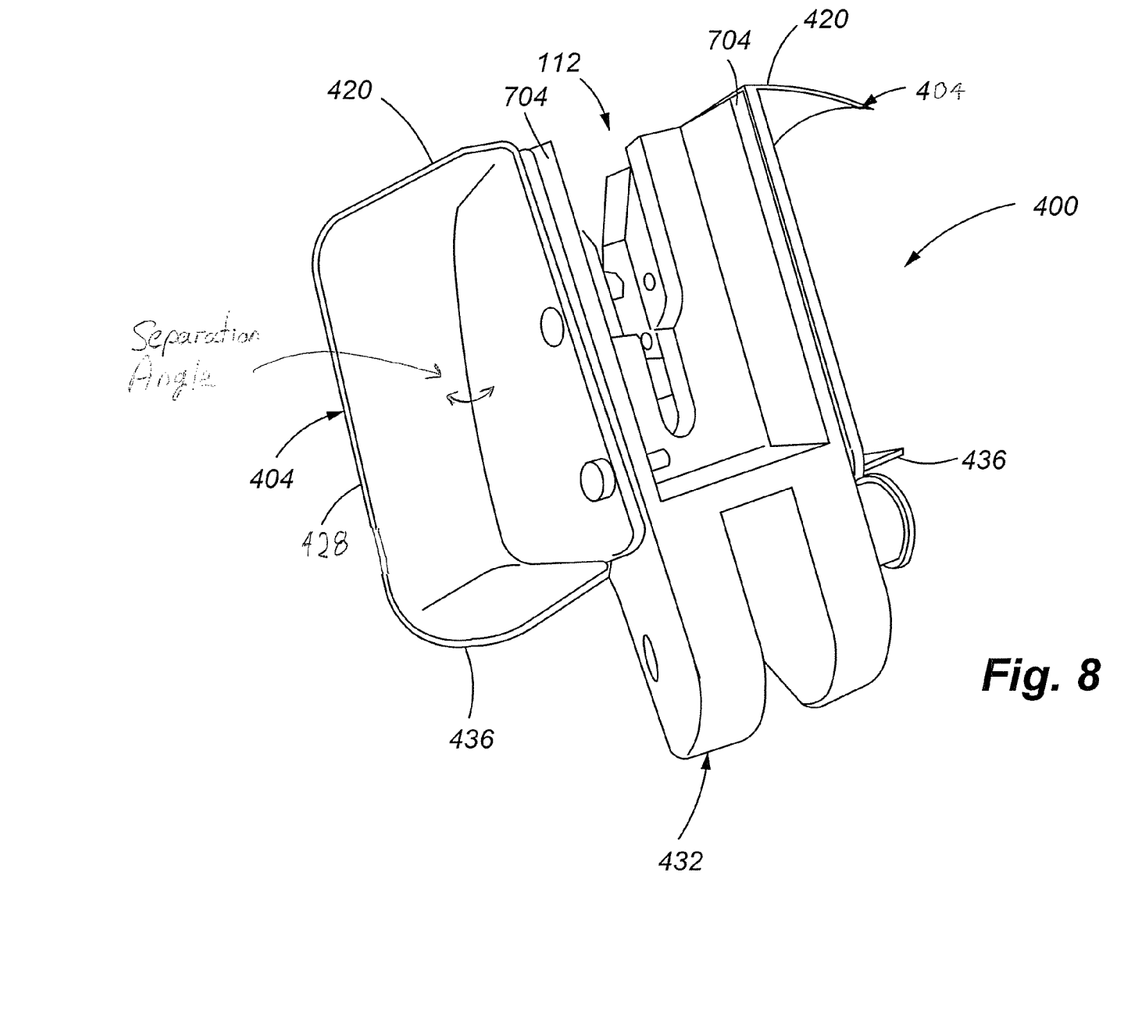
FIGS. 8 and 9 are rear side perspective views of the device shown in FIG. 4.
Figure 9:
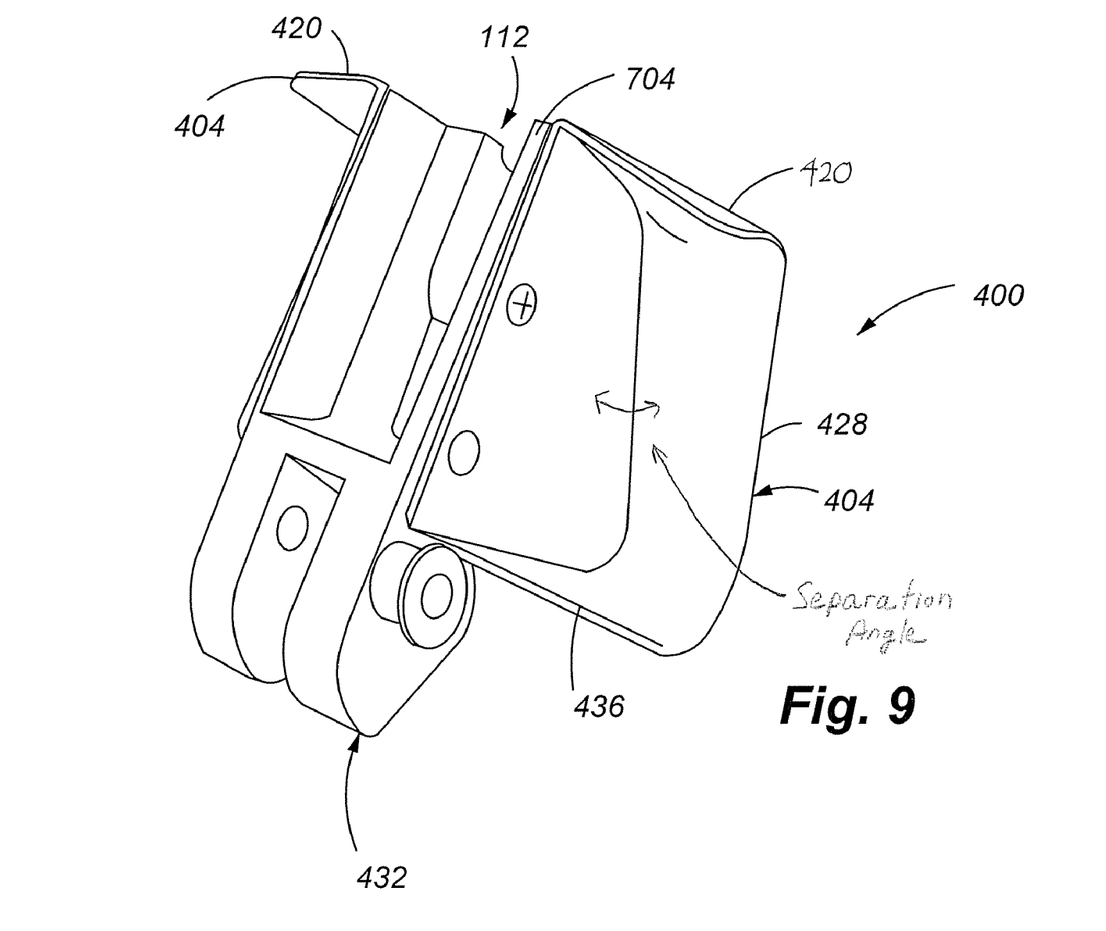

Referring now to FIGS. 8 and 9, reverse angle rear perspective views of the guide 400 are shown in combination with the blade guide 112. The angle of the sloping portions 428 can be seen relative to a back surface 704 of the blade guide 112.

While two guides 300 and 400 are described herein, it should be understood that additional embodiments including differently shaped carcass engaging surfaces are considered with in the scope of the invention. In particular, it may be possible to optimize the shape of the carcass engaging surface by altering their curvature, length, width, steepness, and/or other characteristics to fit a particular application.

Backsaw guides of the present invention, including guide 300 and guide 400, perform two functions during the splitting of a carcass 116. First, the backsaw guides guard the blade and prevent it form being deflected into the blade guide 112. This function is similar to the function of the prior art blade guide guard 104. In addition to guarding the blade, backsaw guides of the present invention also maintain the carcass 116 in a centered alignment with the blade 108.

The present invention may comprise a modification to an existing backsaw part. In particular, carcass engaging surfaces may be welded or otherwise attached to the blade guide guard 104 shown in shown in FIG. 2a. Alternatively, embodiments of the present invention, including guides 300 and 400, may be a single manufactured part. The present invention is made form a durable materials such as cast iron, stainless steel, or high strength polymers.

In accordance with at least one embodiment of the invention, the guide members 404 do not comprise wheels.

The following U.S. patents/patent applications are incorporated herein by reference in their entirety: U.S. Pat. No. 6,607,431; U.S. Pat. No. 6,468,146; U.S. Pat. No. 6,126,536; U.S. Pat. No. 6,050,889; U.S. Pat. No. 6,027,405; U.S. Pat. No. 5,613,905; U.S. Pat. No. 5,312,292; U.S. Pat. No. 5,147,240; U.S. Pat. No. 5,139,457; U.S. Pat. No. 4,970,756; U.S. Pat. No. 4,667,368; U.S. Pat. No. 3,533,131; and U.S. Patent Application Publication No. 2001/0016471.

By way of example and not limitation, all components of the invention described herein are preferably manufactured of a material appropriate for meat processing equipment. For example, the components can be made of stainless steel. However, it is to be understood that other types of materials may also be used, such as titanium or ceramics.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A guide device for a backsaw having a bandsaw blade and a blade guide, the backsaw used to cut a carcass longitudinally down a spine of the carcass, the device comprising:

a first guide member comprising a wall and a first guide member wing disposed at a separation angle of greater than about 90 degrees from the wall, the first guide member wing having a width of between 1 and 3 inches, wherein at least one of an edge and a rear surface of the first guide member wing is interconnected to a portion of a first surface of the wall of the first guide member, the first guide member wing having a first portion, a second portion, and a third portion, wherein the third portion is continuous with the second portion, the first guide member wing including a transition portion between the first and the second portions, wherein the at least one of an edge and rear surface of the first guide member wing includes at least a part of the first, second, third and transition portions;

a second guide member comprising a wall and a second guide member wing disposed at a separation angle of greater than about 90 degrees from the wall, the second guide member wing having a width of between 1 and 3 inches, wherein at least one of an edge and a rear surface of the second guide member wing is interconnected to a portion of a first surface of the wall of second guide member, the second guide member wing having a first portion, a second portion, and a third portion, wherein the third portion is continuous with the second portion, the second guide member wing including a transition portion between the first and the second portions, wherein the at least one of an edge and rear surface of the first guide member wing includes at least a part of the first, second, third and transition portions of the second guide member wing; and a lateral member interconnecting the walls of the first guide member and the second guide member, wherein the lateral member is connected to a second surface of the wall of the first guide member and a second surface of the wall of the second guide member; wherein the wall of the first guide member is substantially parallel to the wall of the second guide member;

wherein a connection between the first portion of the first guide member wing and the wall of the guide member defines a first reference line, a connection between the second portion of the first guide member wing and the wall of the guide member defines a second reference line, a connection between the third portion of the first guide member wing and the wall of the guide member defines a third reference line, and a connection between the transition portion of the first guide member wing and the wall of the guide member defines a transition reference line;

wherein the first and second reference lines are substantially perpendicular, the transition reference line forms a transition angle of between 20 and 30 degrees with respect to the second reference line, and the third reference line is substantially parallel to the first reference line;

wherein the first, second and transition portions engage the carcass during a cut of the carcass.

2. A method of splitting a carcass using a bandsaw, comprising:

aligning the bandsaw with a spine of the carcass;

applying the bandsaw to initiate a cuffing operation to cut the spine in a longitudinal direction;

maintaining the bandsaw within the spine of the carcass by contacting a guide, which is attached to the bandsaw, to the carcass, the contacting comprising engaging portions of the carcass lateral to the spine with first and second non-wheeled carcass engaging surfaces of the guide, wherein the spine is received between the first and second carcass engaging surfaces, the carcass engaging surfaces being disposed at an angle from a reference plane, the reference plane being substantially perpendicular to a plane of the saw; and extending cutting operation to cut the spine until the carcass is split longitudinally;

wherein the guide includes:

a first guide member comprising a wall and a first guide member wing disposed at a separation angle of greater than about 90 degrees from the wall, the first guide member wing having a width of between 1 and 3 inches, wherein at least one of an edge and a rear surface of the first guide member wing is interconnected to a portion of a first surface of the wall of the first guide member, the first guide member wing having a first portion, a second portion, and a third portion, wherein the third portion is continuous with the second portion, the first guide member wing including a transition portion between the first and the second portions, wherein the at least one of an edge and rear surface of the first guide member wing includes at least a part of the first, second, third and transition portions;

a second guide member comprising a wall and a second guide member wing disposed at a separation angle of greater than about 90 degrees from the wall, the second guide member wing having a width of between 1 and 3 inches, wherein at least one of an edge and a rear surface of the second guide member wing is interconnected to a portion of a first surface of the wall of second guide member, the second guide member wing having a first portion, a second portion, and a third portion, wherein the third portion is continuous with the second portion, the second guide member wing including a transition portion between the first and the second portions, wherein the at least one of an edge and rear surface of the first guide member wing includes at least a part of the first, second, third and transition portions of the second guide member wing; and a lateral member interconnecting the walls of the first guide member and the second guide member, wherein the lateral member is connected to a second surface of the wall of the first guide member and a second surface of the wall of the second guide member; wherein the wall of the first guide member is substantially parallel to the wall of the second guide member;

wherein a connection between the first portion of the first guide member wing and the wall of the guide member defines a first reference line, a connection between the second portion of the first guide member wing and the wall of the guide member defines a second reference line, a connection between the third portion of the first guide member wing and the wall of the guide member defines a third reference line, and a connection between the transition portion of the first guide member wing and the wall of the guide member defines a transition reference line;

wherein the first and second reference lines are substantially perpendicular, the transition reference line forms a transition angle of between 20 and 30 degrees with respect to the second reference line, and the third reference line is substantially parallel to the first reference line; and wherein the first, second and transition portions engage the carcass during a cut of the carcass.

3. The method as claimed in claim 2, wherein the carcass engaging surfaces comprise a portion of a blade guard, the blade guard being attached to the bandsaw.

4. The method as claimed in claim 2, wherein the angle is between about 1 and 35 degrees.

5. The method as claimed in claim 2, wherein the angle is between about 5 and 15 degrees.

6. The method as claimed in claim 2:
wherein the carcass engaging surfaces include a first portion, a second portion, and a transition portion between the first and second portions
wherein the first portion initially engages the carcass and thereafter all of the engaging surfaces engage the carcass.

7. The method as claimed in claim 6, wherein the carcass engaging surfaces include a third portion extending from the second portion.

8. The method as claimed in claim 2, wherein the first and second carcass engaging surfaces have a width of between about one and three inches.

9. The method as claimed in claim 2, wherein said contacting comprises maintaining contact between said first and second carcass engaging surfaces and the carcass during at least 50% of the cutting operation.

10. A guide device for a backsaw having a bandsaw blade, the backsaw used to cut a carcass longitudinally down a spine of the carcass, the device comprising:

first and second non-wheeled curved members interconnected to the bandsaw, the first curved member located on a first lateral side of the bandsaw blade and the second curved member located on a second lateral side of the bandsaw blade, wherein the curved members include:

a first guide member comprising a wall and a first guide member wing disposed at a separation angle of greater than about 90 degrees from the wall, the first guide member wing having a width of between 1 and 3 inches, wherein at least one of an edge and a rear surface of the first guide member wing is interconnected to a portion of a first surface of the wall of the first guide member, the first guide member wing having a first portion, a second portion, and a third portion, wherein the third portion is continuous with the second portion, the first guide member wing including a transition portion between the first and the second portions, wherein the at least one of an edge and rear surface of the first guide member wing includes at least a part of the first, second, third and transition portions;

a second guide member comprising a wall and a second guide member wing disposed at a separation angle of greater than about 90 degrees from the wall, the second guide member wing having a width of between 1 and 3 inches, wherein at least one of an edge and a rear surface of the second guide member wing is interconnected to a portion of a first surface of the wall of second guide member, the second guide member wing having a first portion, a second portion, and a third portion, wherein the third portion is continuous with the second portion, the second guide member wing including a transition portion between the first and the second portions, wherein the at least one of an edge and rear surface of the first guide member wing includes at least a part of the first, second, third and transition portions of the second guide member wing; and a lateral member interconnecting the walls of the first guide member and the second guide member, wherein the lateral member is connected to a second surface of the wall of the first guide member and a second surface of the wall of the second guide member; wherein the wall of the first guide member is substantially parallel to the wall of the second guide member;

wherein a connection between the first portion of the first guide member wing and the wall of the guide member defines a first reference line, a connection between the second portion of the first guide member wing and the wall of the guide member defines a second reference line, a connection between the third portion of the first guide member wing and the wall of the guide member defines a third reference line, and a connection between the transition portion of the first guide member wing and the wall of the guide member defines a transition reference line;

wherein the first and second reference lines are substantially perpendicular, the transition reference line forms a transition angle of between 20 and 30 degrees with respect to the second reference line, and the third reference line is substantially parallel to the first reference line;

wherein the first, second and transition portions engage the carcass during a cut of the carcass;

whereby the curved members are adapted to permit the backsaw to come into contact with the carcass so that the bandsaw blade is maintained substantially along the spine of the carcass when the carcass is split longitudinally.

11. The guide device of claim 10, further comprising walls attached to the curved members at an angle of at least 90 degrees.

12. The guide device of claim 11, further comprising at least one lateral member interconnecting the walls.

13. A guide device for a backsaw having a blade guide, the backsaw used to cut a carcass longitudinally down a spine of the carcass, the device comprising:

a first guide member comprising a wall and a laterally projecting first guide member wing disposed at a separation angle from the wall, the first guide member wing having a first portion, a second portion and a transition portion between the first and the second portions, wherein at least one of an edge and a rear surface of the first guide member wing is interconnected to a portion of a first surface of the wall of the first guide member wherein the at least one of an edge and a rear surface includes at least a part of the first, second, and transition portions;

a second guide member comprising a wall and a laterally projecting second guide member wing disposed at a second separation angle from the wall of the second guide member, wherein the wall of the first guide member is substantially parallel to the wall of the second guide member, the second guide member wing having a first portion, a second portion and a transition portion between the first and the second portions, wherein at least one of an edge and a rear surface of the second guide member wing is interconnected to a portion of a first surface of the wall of the second guide member, wherein the at least one of an edge and a rear surface includes at least a part of the first, second, and transition portions of the second guide member wing; and a lateral member interconnecting the first guide member and the second guide member, wherein the lateral member is connected to a second surface of the wall of the first guide member and a second surface of the wall of the second guide member;

wherein the first, second and transition portions of the first and second guide member wings each engage the carcass when the carcass is cut; and wherein a connection between the first portion of the first guide member wing and the first guide member wall defines a first reference line, a connection between the second portion of the first guide member wing and the first guide member wall defines a second reference line, wherein the first reference line and the second reference line are perpendicular.

14. The guide device of claim 13, wherein a connection between the transition portion of the first guide member wing and the first guide member wall defines a transition reference line, wherein the transition reference line forms a transition angle with respect to the second reference line.

15. The guide device of claim 13, wherein the transition angle is between about 10 and 40 degrees.

16. The guide device of claim 13, wherein the transition angle is between about 20 and 30 degrees.

17. A guide device for a backsaw having a blade guide, the backsaw used to cut a carcass longitudinally down a spine of the carcass, the device comprising:

a first guide member comprising a wall and a laterally projecting first guide member wing disposed at a separation angle from the wall, the first guide member wing having a first portion, a second portion and a transition portion between the first and the second portions, wherein at least one of an edge and a rear surface of the first guide member wing is interconnected to a portion of a first surface of the wall of the first guide member wherein the at least one of an edge and a rear surface includes at least a part of the first, second, and transition portions;

a second guide member comprising a wall and a laterally projecting second guide member wing disposed at a second separation angle from the wall of the second guide member, wherein the wall of the first guide member is substantially parallel to the wall of the second guide member, the second guide member wing having a first portion, a second portion and a transition portion between the first and the second portions, wherein at least one of an edge and a rear surface of the second guide member wing is interconnected to a portion of a first surface of the wall of the second guide member, wherein the at least one of an edge and a rear surface includes at least a part of the first, second, and transition portions of the second guide member wing; and a lateral member interconnecting the first guide member and the second guide member, wherein the lateral member is connected to a second surface of the wall of the first guide member and a second surface of the wall of the second guide member;

wherein the first, second and transition portions of the first and second guide member wings each engage the carcass when the carcass is cut; and wherein the first guide member wing further comprises a third portion, the third portion of the first guide member wing extending from the second portion of the first guide member wing, wherein the third portion is connected directly to the first surface of the wall of the first guide member and disposed at the first separation angle from the wall of the first guide member;

wherein the second guide member wing further comprises a third portion, the third portion of the second guide member wing extending from the second portion of the second guide member wing, wherein the third portion of the second guide member wing is connected directly to the first surface of the wall of the second guide member and disposed at the second separation angle from the wall of the second guide member;

wherein a connection between the first portion of the first guide member wing and the first guide member wall defines a first reference line, a connection between the second portion of the first guide member wing and the first guide member wall defines a second reference line, the transition portion of the first guide member wing and the first guide member wall defines a transition reference line, a connection between the third portion of the first guide member wing and the first guide member wall defines a third reference line; and wherein the first and second reference lines are substantially perpendicular, the transition reference line forms a transition angle with respect to the second reference line and the third reference line is substantially parallel to the first reference line.

* * * * *